United States Patent [19]

Pow et al.

[11] Patent Number: 5,249,624
[45] Date of Patent: Oct. 5, 1993

[54] LOAD-FOLLOWING VAPORIZER APPARATUS AND METHOD

[75] Inventors: Eric G. Pow; Nicholas J. Fletcher, both of Vancouver; Wolfgang Schlosser, Burnaby, all of Canada

[73] Assignee: Her Majesty the Queen in right of Canada, as represented by the Minister of National Defence, Ottawa, Canada

[21] Appl. No.: 977,621

[22] Filed: Nov. 17, 1992

[51] Int. Cl.$^5$ .............................................. F22B 27/16
[52] U.S. Cl. .................................. 165/110; 165/146; 122/40; 392/399; 392/484
[58] Field of Search ............... 165/110, 146, 908, 911; 122/40, 41; 392/399, 484

[56] References Cited

U.S. PATENT DOCUMENTS

| | | | |
|---|---|---|---|
| 3,243,575 | 3/1966 | Vignere, Sr. | 122/40 X |
| 4,616,122 | 10/1986 | Burian | 382/399 X |
| 4,866,250 | 9/1989 | Pasbrig | 392/484 X |
| 5,161,610 | 11/1992 | Leidinger | 122/40 X |

OTHER PUBLICATIONS

"Spray Nozzles & Accessories", (Excerpt) *Spraying Systems Co.*, unknown date.

*Primary Examiner*—John Rivell
*Attorney, Agent, or Firm*—McAndrews, Held & Malloy, Ltd.

[57] ABSTRACT

A load-following vaporizer converts an inlet liquid reactant stream to an outlet vapor reactant stream. The vaporizer comprises a containment shell, a nozzle and a fin block. The fin block has a base in thermal contact a heat source, preferably a thermal fluid stream. The base has a plurality of evaporative heat transfer structures that are spaced from and generally radiate from the nozzle outlet. Each of the evaporative heat transfer structures has two principal surfaces oriented such that the extension of each of the surfaces intersects the nozzle outlet. Upon contacting the evaporative heat transfer structures, the atomized liquid reactant dispersion is vaporized to produce a vaporized reactant stream. The vaporizer rapidly responds to changes in the inlet liquid reactant flow rate to produce a corresponding change in the output vapor flow rate by minimizes the liquid inventory within the heated environment. The load-following vaporizer is compact, lightweight and compatible with other components of an integrated fuel processing system.

10 Claims, 5 Drawing Sheets

LOAD-FOLLOWING VAPORIZER APPARATUS AND METHOD

FIELD OF THE INVENTION

The present invention relates to chemical reaction apparatus, and in particular to a vaporizer for liquid reactants which has a rapid response time to transient reactant throughputs.

BACKGROUND OF THE INVENTION

Electrochemical fuel cells convert a fuel and an oxidant to electricity and reaction product. In electrochemical fuel cells employing hydrogen as the fuel and oxygen as the oxidant, the reaction of hydrogen and oxygen produces electric current and water as the reaction product.

In applications employing electrochemical fuel cells to supply electric current to a variable load, such as, for example, vehicular applications, it is desirable that the power generation system have a rapid response time. The power supplied to the load by the system should respond quickly to changes in the power demanded by the load, so that additional power is provided immediately upon an increase in the load demand and conversely power output is immediately reduced upon a decrease in the load demand.

Recently, efforts have been devoted to developing hydrogen/oxygen fuel cell based power generation systems for vehicular, utility, industrial and residential applications using hydrogen derived from hydrocarbon conversion or reformation processes as the fuel. In such applications, the use of substantially pure hydrogen is disadvantageous because of the expense of producing and storing pure hydrogen gas and the general availability of hydrocarbon fuel sources such as natural gas and methanol. In addition, the use of liquid fuels is preferable to pure, bottled hydrogen in mobile and vehicular applications because liquid fuels are generally easier and safer to transport and store than gaseous fuels.

Conversion of hydrocarbons to hydrogen is generally accomplished through the steam reformation of a hydrocarbon such as methanol in a reactor sometimes referred to as a reformer. The steam reformation of methanol is represented by the following chemical equation:

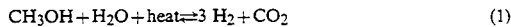

$$CH_3OH + H_2O + heat \rightleftharpoons 3 H_2 + CO_2 \qquad (1)$$

Due to competing reactions, the initial gaseous mixture produced by steam reformation of methanol typically contains from about 65% to about 75% hydrogen, along with about 10% to about 25% carbon dioxide, and about 0.5% to about 20% by volume of carbon monoxide, on a dry basis (water vapor can also be present in the gas stream). The relatively small amount of carbon monoxide in the initial reformate gas mixture produced by the steam reformer can be further reduced by a selective oxidizing reactor to a level sufficiently low that the resulting hydrogen-containing reformate gas mixture can then be employed as the fuel source in hydrogen/oxygen fuel cells. In a selective oxidizing reactor, oxygen or an oxygen-containing gas mixture is introduced at locations along an isothermal reaction chamber containing catalyst to selectively oxidize the carbon monoxide to carbon dioxide and to suppress the reverse water-shift reaction, which produces carbon monoxide and water from carbon dioxide and hydrogen.

Fuel cell based power generation systems operating on reformed fuel can be viewed as a series of interconnected mechanical components and reactors. One such component is the vaporizer, which converts a raw liquid fuel source, such as methanol and water, to a vapor for subsequent conversion in the steam reformer to hydrogen and carbon dioxide, as set forth in equation (1) above. Since the response time of the overall power generation system is dependent upon the response time of each individual component, the vaporizer component should exhibit a minimal response time itself, and provide an increased vapor flow immediately upon an increase in the load demand.

Two approaches have been considered in the development of a vaporizer with a rapid response time: (1) a pressurized boiler, and (2) a once-through vaporizer. The pressurized boiler approach is considered to be less preferred because of the complexity of control and the inherent danger of a boiler containing a combustible hydrocarbon mixture.

The vaporizer disclosed herein employs a thermal fluid to distribute heat to the various heat transfer structures that first vaporize the liquid reactant fuel mixture and then superheat the vaporized mixture. The present vaporizer is designed to become part of an integrated fuel processing system, and has a geometry that is compatible with other fuel processing system components, such as the steam reformer and the selective oxidizing reactor discussed above.

The present vaporizer comprises three major components: a containment shell, a nozzle, and a fin block. An evaporator cap and a superheater cap segregate the respective evaporation and superheating chambers on either side of the fin block within the containment shell. In the embodiment disclosed herein, the vaporizer components are consolidated between two end plates or flanges. In an integrated fuel processing system, the vaporizer described herein will rely upon the end structure of the adjacent system components for consolidation and pressure containment.

One of the important principles underlying the vaporizer design disclosed herein is the avoidance of the pooling of liquids within the heated environment. Any such pooling represents a liquid inventory, and the size of the liquid inventory is a function of both the flow rate of the reactant mixture through the vaporizer and the heat transfer rate from the thermal fluid to the heat transfer structures of the vaporizer. Thus, the size of the liquid inventory will vary under different load conditions, and there will be a time lag between a change of the inlet liquid reactant flow rate and a corresponding change in the output vapor flow rate. This time lag, together with similar delays in other reactor components, contributes to a decrease in the overall response time of the fuel processing system, of which the vaporizer is a part. In order to be load-following, therefore, the time lag resulting from the presence of a liquid inventory should be minimized.

To avoid pooling, liquid entering the vaporizer should substantially instantaneously contact a heated surface with sufficient heat capacity to vaporize the liquid. The optimal vaporizer will therefore expose entering liquid to a maximum area of heated surface, at the highest temperature, and with a maximum heat capacity.

Accordingly, it is an object of the present invention to provide a load-following vaporizer that exhibits a minimal time lag between a change of the inlet liquid reactant flow rate and a corresponding change in the output vapor flow rate.

It is also an object of the invention to provide a load-following vaporizer that minimizes the liquid inventory within the heated environment.

It is a further object of the invention to provide to provide a load-following vaporizer that is compact, lightweight and compatible with other components of an integrated fuel processing system.

SUMMARY OF THE INVENTION

The above and other objects are achieved by a load-following vaporizer for converting an inlet liquid reactant stream to an outlet vapor reactant stream. The vaporizer comprises:

(A) a containment shell having an inlet for receiving the inlet liquid reactant stream, an outlet for discharging the outlet vapor reactant stream from the vaporizer, and a heat source;

(B) a nozzle having an inlet for receiving the inlet liquid reactant stream and an outlet for producing an atomized liquid reactant dispersion;

(C) a fin block disposed within the containment shell, the fin block comprising:

(1) a base in thermal contact with the heat source, the base having a plurality of evaporative heat transfer structures extending therefrom, the structures spaced from and generally radiating from the nozzle outlet, each of the evaporative heat transfer structures having two principal surfaces oriented such that the extension of each of the surfaces intersects the nozzle outlet, whereby the atomized liquid reactant dispersion is vaporized upon contacting the surfaces to produce a vaporized reactant stream;

(2) means for directing the vaporized reactant stream to the first containment shell outlet.

In the preferred vaporizer, the heat source comprises a thermal fluid stream and the containment shell further comprises an inlet for receiving the thermal fluid stream and an outlet for discharging the thermal fluid stream from the containment shell. The fin block base preferably comprises in its interior portion at least one channel for directing the thermal fluid stream therethrough. The base is preferably formed of cast metal and the thermal fluid channel is a coiled tube cast in place within the interior portion of the base. The base is most preferably formed of cast aluminum and the coiled tube is most preferably formed of stainless steel.

In the preferred vaporizer, the means for directing the vaporized reactant stream to the first containment shell outlet comprises at least one labyrinthine channel. The walls of the labyrinthine channel are formed by a plurality of superheating heat transfer structures extending from the base on the side opposite the evaporative heat transfer structures. The vaporized reactant stream is further heated before being discharged from the first containment shell outlet.

In the preferred vaporizer, the containment shell and the fin block are substantially cylindrical and the nozzle outlet is mounted generally at the radially outermost portion of the fin block.

A method of vaporizing an inlet liquid reactant stream to produce an outlet vapor reactant stream is also provided. The method comprises:

(A) directing the inlet liquid reactant stream through a nozzle having an outlet to produce an atomized liquid reactant dispersion;

(B) directing the atomized liquid reactant dispersion toward a plurality of evaporative heat transfer structures, the structures spaced from and generally radiating from the nozzle outlet, each of the structures having two principal surfaces oriented such that the extension of each of the surfaces intersects the nozzle outlet, (C) supplying heat to the evaporative heat transfer structures sufficient to vaporize the inlet liquid reactant stream.

The atomized liquid reactant dispersion is vaporized upon contacting the surfaces to produce a vaporized reactant stream.

In the preferred method, the heat is supplied to the evaporative heat transfer structures by a thermal fluid in thermal contact with the evaporative heat transfer structures.

The method preferably further comprising the step of:

(D) directing the vaporized reactant stream into thermal contact with a plurality of superheating heat transfer structures, the superheating heat transfer structures in thermal contact with the thermal fluid.

DETAILED DESCRIPTION OF THE PREFERRED EMBODIMENTS

Figure 1:
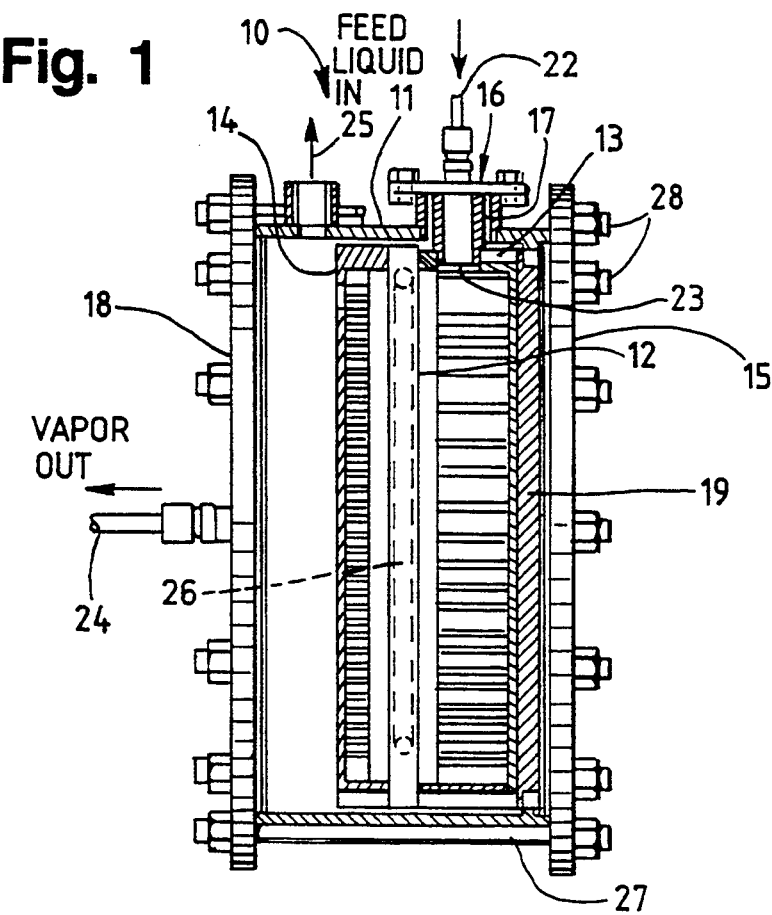
FIG. 1 is a side sectional view of the load-following vaporizer assembly, showing the containment shell, fin block, evaporator cap, superheater cap, nozzle, and end plates.
Figure 2:
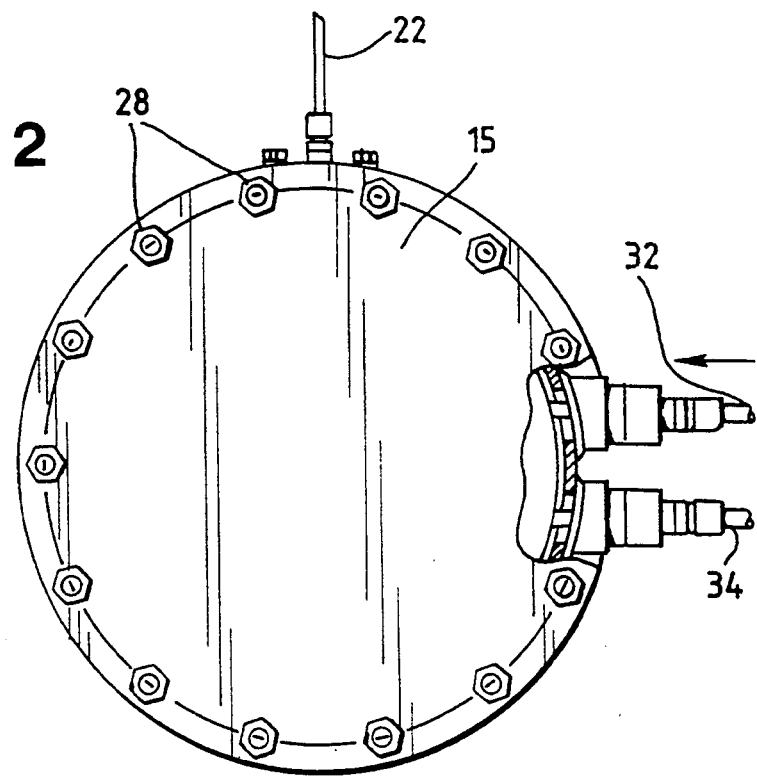
FIG. 2 is an end view, partially in section, of the load-following vaporizer assembly of FIG. 1, showing the end plate and thermal fluid inlet and outlet.

Referring now to FIGS. 1 and 2, load-following vaporizer assembly 10 comprises containment shell 11, fin block 12, evaporator cap 13, superheater cap 14, first end plate 15, nozzle mounting plate 16, nozzle assembly 17, second end plate 18, and spacer plate 19. Liquid reactant stream 22 is the feed stream to vaporizer 10. vaporized reactant stream 24 is the discharge stream from vaporizer 10. Thermal fluid stream 32, preferably oil exhibiting suitable heat conductivity and stability properties, is the preferred heat source for vaporizer 10. The thermal fluid exits vaporizer 10 as discharge thermal fluid stream 34. The thermal fluid circulates through a coiled tube 26 cast in place in the interior of the base portion of fin block 12.

As shown in FIG. 1, containment shell 11 has inlet openings formed therein for supplying inlet liquid reactant stream 22 and thermal fluid stream 32 to the fin block 12. Containment shell 11 also has openings formed therein for discharging vaporized reactant stream 24 and thermal fluid stream 34 from vaporizer 10. To provide an alternate location for the discharge reactant stream, containment shell 11 has an opening formed therein for discharging vaporized reactant stream 25 from the radially outermost side of vaporizer 10.

Vaporizer assembly 10 is consolidated by threaded tie rods, one of which is illustrated in FIG. 1 as tie rod 27, extending through openings formed in end plates 15 and 18. Tie rods 27 are secured on both ends by nuts, two of which are designated in FIGS. 1 and 2 as nuts 28.

As shown in FIG. 1, nozzle assembly 17 includes a nozzle which atomizes liquid reactant stream 22 to produce a dispersed spray. The atomized dispersion from nozzle outlet 23 corresponds substantially to the volume within evaporator cap 13 and the base portion of fin block 12. The preferred nozzle is a commercially available component, namely, Unijet TP 65 degree and 73 degree spray tips, available from Spraying Systems Co. Nozzle outlet 23 creates a fan spray when supplied with liquid flow rates corresponds with the reactant flow rates required for electrochemical fuel cell fuel processing applications, but does not impart an excessive pressure drop in the reactant stream. Nozzle 23 is flexibly mounted on tubing which extends between containment shell 11 and evaporator cap 13 to accommodate thermal expansion between shell 11 and the internal components.

A fuel injector can also be associated with inlet liquid reactant stream 22. The fuel injector prevents the flow rate of the inlet stream 22 from decreasing below the minimum flow rate required to create an atomized dispersion from nozzle outlet 23. The fuel injector comprises a solenoid device that provides an inlet stream to nozzle outlet 23 so that the flow is broken into discrete quanta having a constant pressure drop. The fuel injector also provides precise metering of the inlet stream flow rate, in addition to providing an adequate flow rate of liquid to permit the nozzle to produce the required atomized dispersion.

Figure 3:
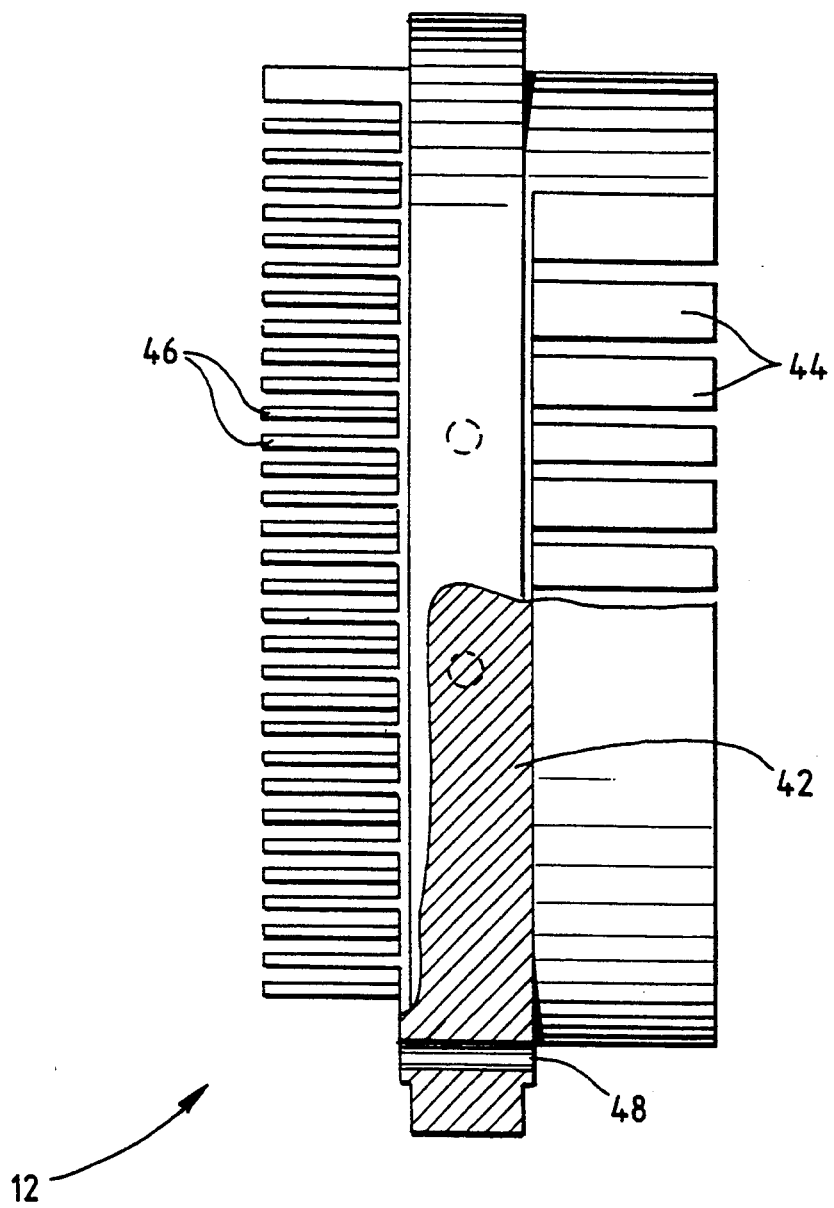
FIG. 3 is a side view, partially in section, of the fin block of the load-following vaporizer of FIG. 1.

Referring now to FIG. 3, the fin block 12 of the load-following vaporizer 10 of FIG. 1 is separately illustrated. Fin block 12 is preferably cylindrical to correspond to the preferred conformation of the containment shell. Fin block 12 includes a base portion 42 having evaporative heat transfer structures, two of which are illustrated in FIG. 3 as structures 44, extending therefrom. Superheating heat transfer structures, two of which are illustrated in FIG. 3 as structures 46, extend from fin block base 42 on the side opposite evaporative heat transfer structures 44. Openings, one of which is illustrated in FIG. 3 as opening 48, are formed in fin block base 42 to provide fluids to communicate from volume occupied by evaporative heat transfer structures 44 to the volume occupied by superheating heat transfer structures 46.

Heat transfer structures 44 and 46 are illustrated in FIG. 3 as being formed integrally with fin block base 42. Heat transfer structures can also be formed as separate components that are fitted into corresponding slots formed in the respective surfaces of fin block base 42.

Figure 6:
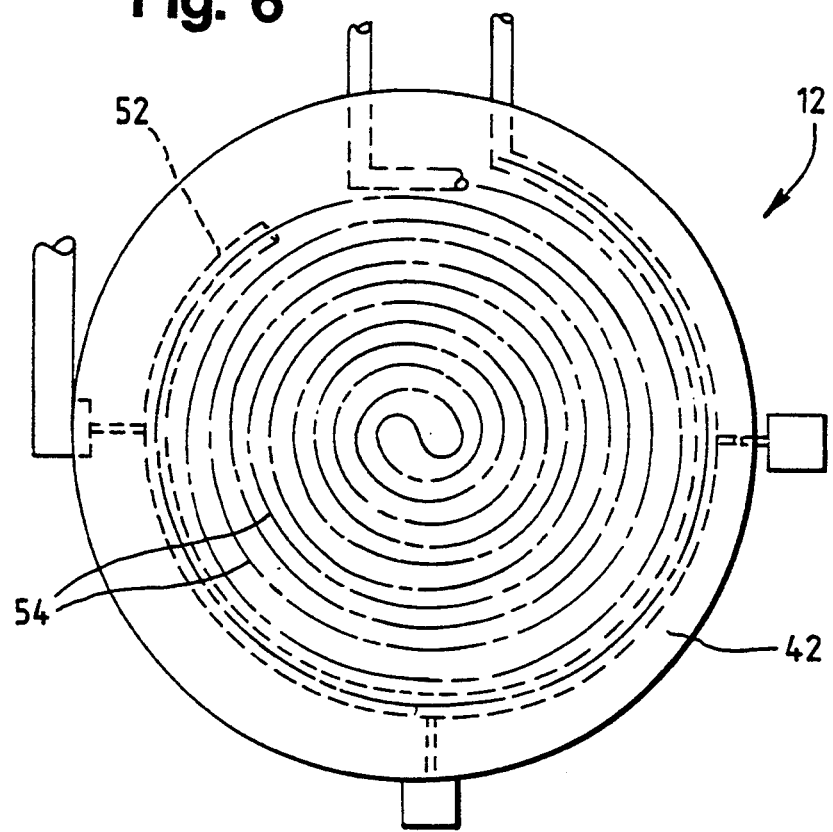
FIG. 6 is an end view of the base portion of the fin block of FIG. 3, showing in phantom lines the coiled thermal fluid tube cast in place in the fin block base.

Fin block 12 conducts heat from a thermal fluid to the extended heat transfer structures 44 and 46. As illustrated in FIG. 6, thermal fluid is contained within a double spiral or coil of tubing 52, two loops of which are designated in FIG. 6 as loops 54. The spirals are interconnected at the central portion of fin block base 42. The coiled tubing 52, preferably formed of stainless steel, is cast into the aluminum of which fin block 12 is formed. Aluminum is the preferred material for the fin block components because of its thermal conductivity and relatively light weight.

The coiled tubing cast in the fin block avoids the problem of providing an aluminum pressure vessel, as operating temperatures of vaporizer 10 are above those at which aluminum is rated for pressure containment. In addition, the tubing cast in the fin block solves the complex problem of creating a seal between boundaries of different materials (here aluminum and stainless steel), over a wide range of temperatures. The cast in place arrangement also minimizes the size of high temperature seals, enabling the use of commercially available, stainless steel tube fittings, which are rated above the operating temperatures and pressures of the present vaporizer.

Figure 4:
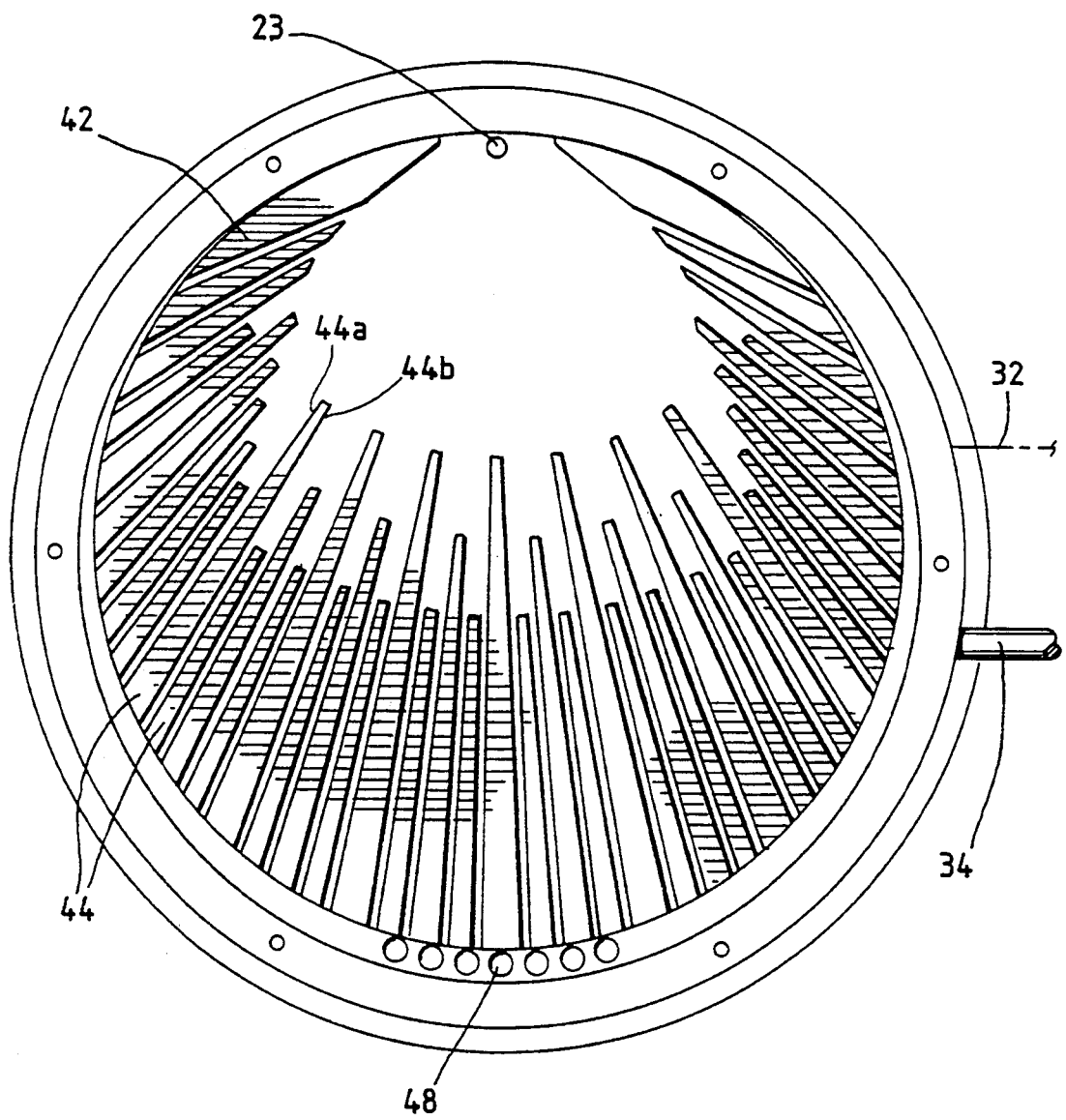
FIG. 4 is an end view of the fin block of FIG. 3, showing the evaporative heat transfer structures extending from the fin block base.

Referring now to FIG. 4, evaporative heat transfer structures, two of which are designated as structures 44 in FIG. 4, extending from the fin block base 42. Evaporative heat transfer structures 44 are spaced from and generally radiate from nozzle outlet 23. Each of the evaporative heat transfer structures 44 has two principal heat transfer surfaces, illustrated in FIG. 4 as surfaces 44a and 44b. Surfaces 44a and 44b are oriented such that the extension of each of the surfaces intersects nozzle outlet 23. Upon contacting the surfaces 44a and 44b, the atomized liquid reactant dispersion is vaporized to produce a vaporized reactant stream.

Surfaces 44a and 44b are typically formed with a flat, planar configuration, as illustrated in FIG. 4. Surfaces 44a and 44b could also be formed with a curved, bowed configuration, when viewed from the end shown in FIG. 4. With either configuration, the extension of the surface intersects nozzle outlet 23.

Structures 44 are arranged to present a maximum heat transfer surface area to the incoming atomized dispersion from nozzle outlet 23 to avoid liquid pooling. The arrangement of structures 44 is intended to incorporate the maximum surface area per unit volume in the evaporator portion of vaporizer 10. The configuration of the spaces between structures 44 balances the need to have the first surface contacted by the atomized liquid dispersion avoid accumulating liquid, while presenting a maximum amount of heat transfer surface area to the atomized dispersion. As further shown in FIG. 4, structures 44 are also arranged to provide adequate space or clearance between nozzle outlet 23 and structures 44 to allow the atomized dispersion to adequately develop.

In the arrangement of FIG. 6, there the possibility that an atomized droplet could travel through the space between structures 44 and accumulate as liquid. To counteract such a possibility of liquid pooling, a mesh can be incorporated at the outer periphery of fin block base 42 opposite nozzle outlet 23 to provide a tortuous path for the droplets and prevent pooling.

Figure 5:
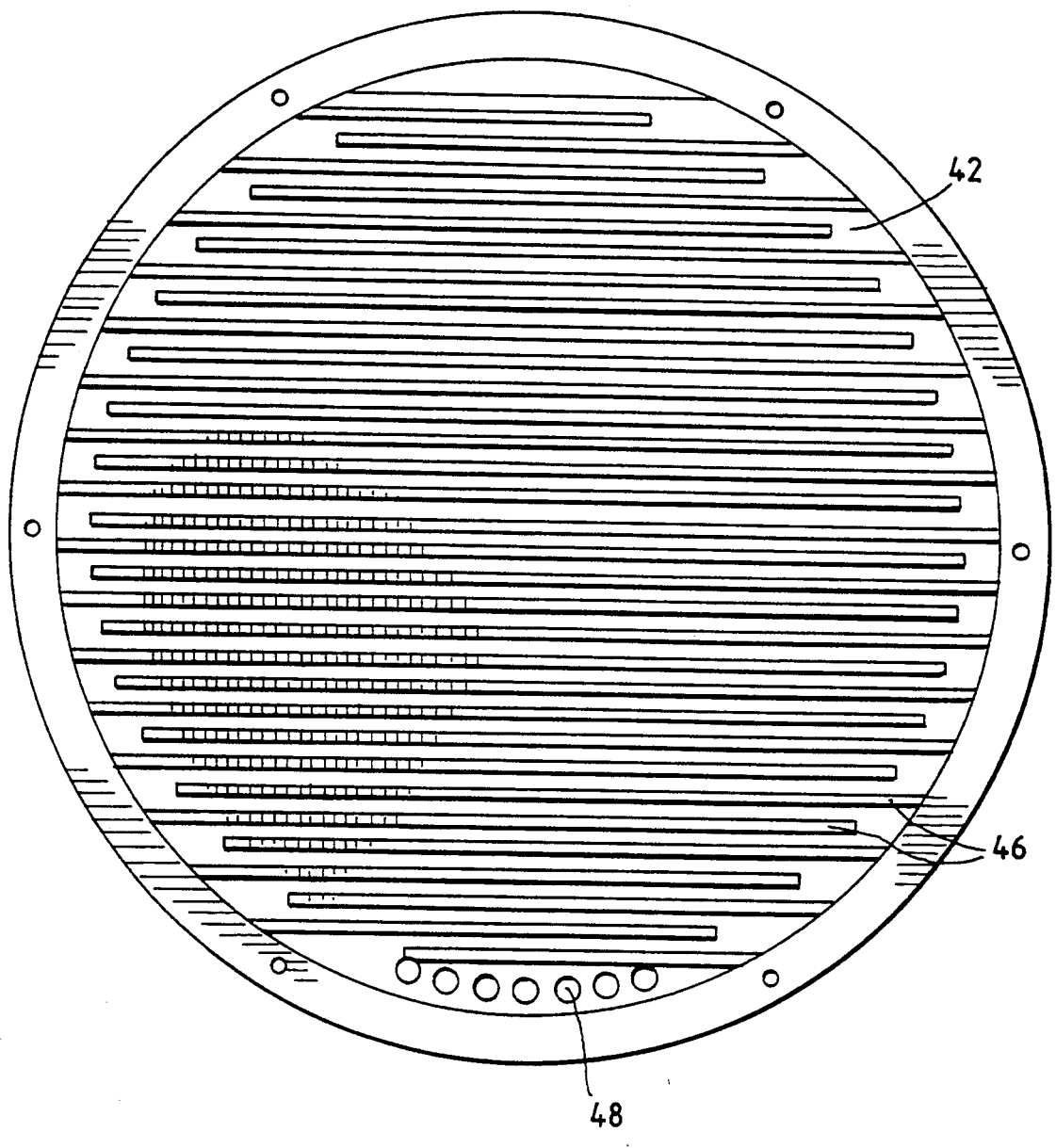
FIG. 5 is an end view of the fin block of FIG. 3, showing the superheating heat transfer structures extending from the fin block base on the side opposite the evaporative heat transfer structures shown in FIG. 4.

Referring now to FIG. 5, superheating heat transfer structures 46 extend from the fin block base 42 on the side opposite the evaporative heat transfer structures shown in FIG. 4. The vaporized stream produced by the evaporative heat transfer structures is directed to the superheating heat transfer structures by openings formed in fin block base 42, one of which is illustrated in FIG. 5 as opening 48. As shown in FIG. 5, superheating heat transfer structures 46 form the walls of a labyrinthine channel through which the vaporized reactant stream flows and is further heated before being discharged from the vaporizer. The labyrinthine channel provides a high heat transfer surface area to volume ratio for the superheated reactant stream, and provides for turbulent flow of the reactant stream within the labyrinthine channel.

Figure 7:
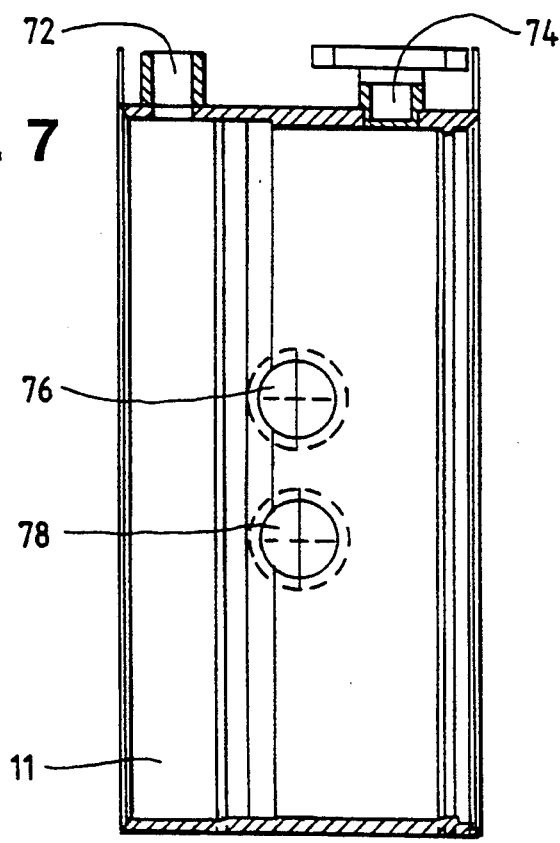
FIG. 7 is a side sectional view of the containment shell of the load-following vaporizer of FIG. 1.

Referring finally to FIG. 7, containment shell 11 serves as a pressure containment vessel for the reactant gases, and is preferably cylindrical. Shell 11 has openings 72 and 74 formed therein for the superheated reactant discharge stream (alternate side location) and the nozzle assembly, respectively. Openings 76 and 78 correspond to the inlet thermal fluid stream and discharge thermal fluid stream, respectively. The tubing penetrations within the shell openings are a standoff type to minimize stress from thermally induced deflections. The preferred material for shell 11 is stainless steel to provide a secure vessel at the operating temperatures and pressures of the vaporizer. The arrangement of the internal components within shell 11, shown in FIG. 1, enables thermal expansion without stressing the shell or internal components.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A load-following vaporizer for converting an inlet liquid reactant stream to an outlet vapor reactant stream, said vaporizer comprising:
   (A) a containment shell having an inlet for receiving said inlet liquid reactant stream, an outlet for discharging said outlet vapor reactant stream from the vaporizer, and a heat source;
   (B) a nozzle having an inlet for receiving said inlet liquid reactant stream and an outlet for producing an atomized liquid reactant dispersion;
   (C) a fin block disposed within said containment shell, said fin block comprising:
      (1) a base in thermal contact with said heat source, said base having a plurality of evaporative heat transfer structures extending therefrom, said structures spaced from and generally radiating from said nozzle outlet, each of said structures having two principal surfaces oriented such that the extension of each of said surfaces intersects said nozzle outlet, whereby said atomized liquid reactant dispersion is vaporized upon contacting said surfaces to produce a vaporized reactant stream;
      (2) means for directing said vaporized reactant stream to said first containment shell outlet.

2. The vaporizer of claim 1 wherein said heat source comprises a thermal fluid stream and said containment shell further comprises an inlet for receiving said thermal fluid stream and an outlet for discharging said thermal fluid stream from said containment shell.

3. The vaporizer of claim 2 wherein said base comprises in its interior portion at least one channel for directing said thermal fluid stream therethrough.

4. The vaporizer of claim 3 wherein said base is formed of cast metal and wherein said thermal fluid channel is a coiled tube cast in place within the interior portion of said base.

5. The vaporizer of claim 4 wherein said base is formed of cast aluminum and wherein said coiled tube is formed of stainless steel.

6. The vaporizer of claim 1 wherein said means for directing said vaporized reactant stream to said first containment shell outlet comprises at least one labyrinthine channel, the walls of said labyrinthine channel formed by a plurality of superheating heat transfer structures extending from said base on the side opposite said evaporative heat transfer structures, whereby said vaporized reactant stream is further heated before being discharged from said first containment shell outlet.

7. The vaporizer of claim 1 wherein said containment shell and said fin block are substantially cylindrical and wherein said nozzle outlet is mounted generally at the radially outermost portion of said fin block.

8. A method of vaporizing an inlet liquid reactant stream to produce an outlet vapor reactant stream, said method comprising:
   (A) directing said inlet liquid reactant stream through a nozzle having an outlet to produce an atomized liquid reactant dispersion;
   (B) directing said atomized liquid reactant dispersion toward a plurality of evaporative heat transfer structures, said structures spaced from and generally radiating from said nozzle outlet, each of said structures having two principal surfaces oriented such that the extension of each of said surfaces intersects said nozzle outlet,
   (C) supplying heat to said structures sufficient to vaporize said inlet liquid reactant stream;
whereby said atomized liquid reactant dispersion is vaporized upon contacting said surfaces to produce a vaporized reactant stream.

9. The method of claim 8 wherein said heat is supplied to said evaporative heat transfer structures by a thermal fluid in thermal contact with said structures.

10. The method of claim 9 further comprising the step of:
   (D) directing said vaporized reactant stream into thermal contact with a plurality of superheating heat transfer structures, said superheating heat transfer structures in thermal contact with said thermal fluid.

* * * * *